April 9, 1935. F. H. BENGE 1,996,741
METHOD OF MANUFACTURING COMPOSITE CYLINDRICAL ARTICLES
Filed July 20, 1932
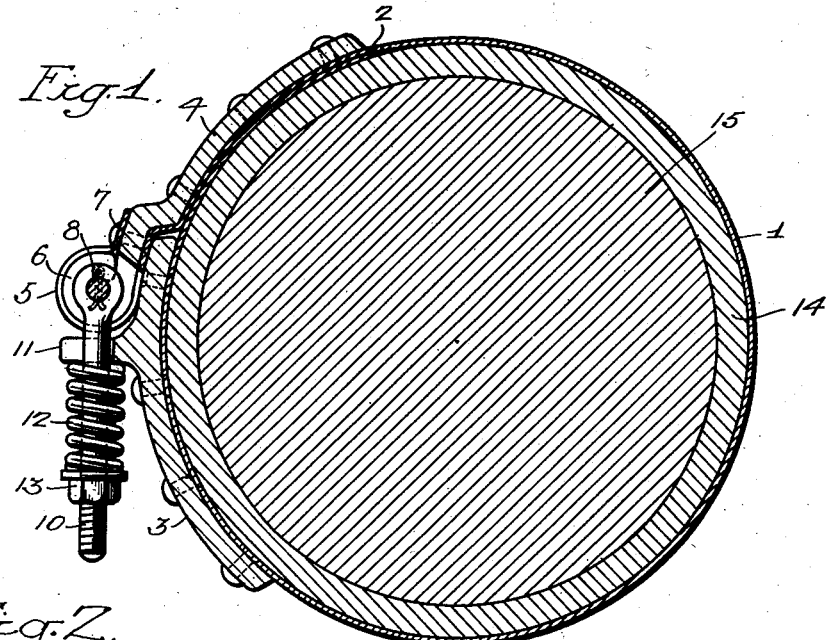
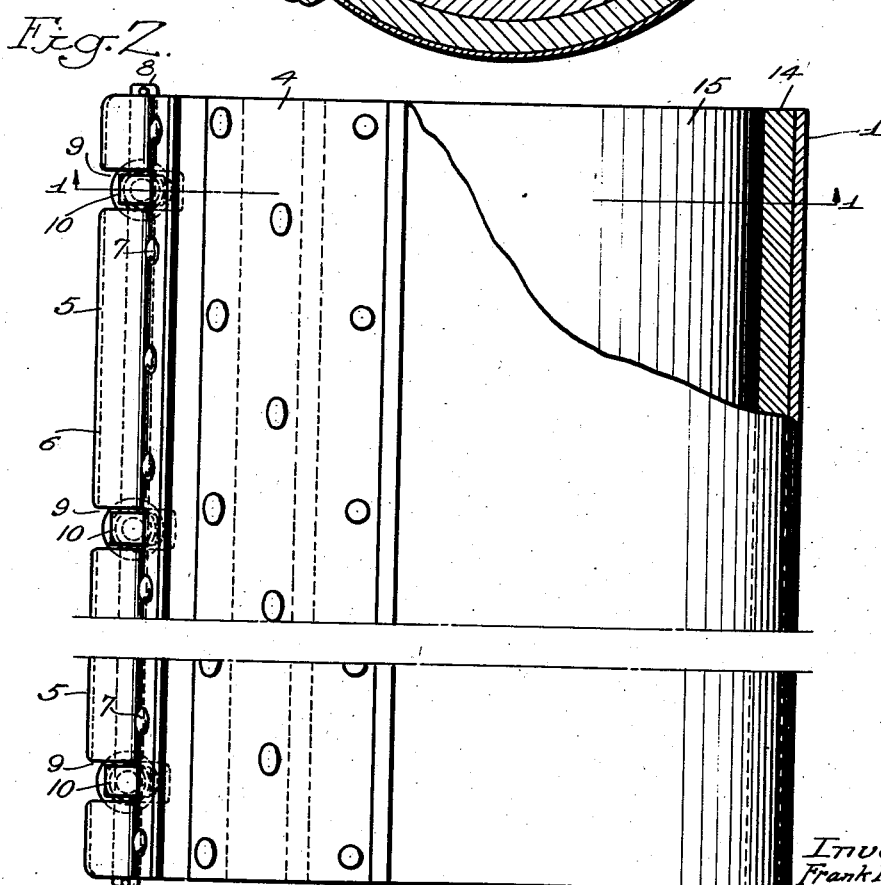
Inventor:
Frank H. Benge
by his Attorneys
Howson & Howson Patented Apr. 9, 1935

1,996,741

UNITED STATES PATENT OFFICE 1,996,741

METHOD OF MANUFACTURING COMPOSITE CYLINDRICAL ARTICLES

Frank H. Benge, Norristown, Pa., assignor to Continental-Diamond Fibre Company, Newark, Del., a corporation of Delaware Application July 20, 1932, Serial No. 623,619

8 Claims. (Cl. 93—94)

My invention relates to an improved method of making composite cylindrical articles of the type which are manufactured by winding fibrous sheet materials, such as paper or cloth, associated with a binder until the desired thickness of superposed sheets is obtained.

One object of my invention is to provide a method of making composite cylindrical articles such as tubes or rods, which process is simple and expedient to carry out without the use of molds or other expensive equipment.

A further object of my invention is to furnish a method of making composite cylindrical articles, which process results in a dense, hard, homogeneous article having no tendency to delaminate.

Still another object of the present invention is to provide a process of making tubes or rods of the type which comprise superposed sheets of fibrous material associated with a binder, the articles obtained being easily machined, low in water-absorption, free from air or other bubbles, and high in dielectric strength.

Other objects will be apparent from a consideration of the specification and claims.

Heretofore, tubes and rods have been manufactured by winding fibrous sheet material associated with a binder until the desired thickness of superposed sheets is obtained. In the manufacture of tubes, the sheets have been wound upon a mandrel, while in the production of rods, the sheet material has been wound either with or without a central core. The tubes or rods have thereafter been subjected to heat to cause adhesion of the superposed sheets. Two heating methods have been employed, one resulting in the so-called "rolled" product and the other resulting in the so-called "molded" product. In the manufacture of the rolled product, the tube is subjected to heat in an oven without the application of pressure, the tension employed in winding the fibrous sheet material being relied upon to cause adhesion of the sheets. The product obtained is satisfactory for many purposes but is characterized by relatively low density, and dielectric strength and by relatively high water-absorption. It is also somewhat difficult to machine due to air and other bubbles and has a tendency to delaminate. In the manufacture of the molded product, the composite article is placed in a mold and heated under high pressures. This product is denser, has higher dielectric strength and lower water-absorption than the rolled product, and has no tendency to delaminate. The molded product, however, is inherently weak where the seams of the mold occur. Furthermore, due to the expensive nature of the molds, only tubes and rods of relatively small cross-section are made by the molding method.

The method of the present invention results in a tube or rod having the desirable properties of both the rolled product and the molded product without the disadvantages of either type. The product obtained has a density, dielectric strength, and water-absorption factor comparable to the molded product. It is free from bubbles, easy to machine, and has no tendency to delaminate. It also has no lines of weakness since during the heating operation uniform high pressure is applied throughout the entire surface of the article, thus obviating the main objection to the molded product. The article of the present invention can, therefore, withstand very much greater pressures. The method also does not require the use of molds or other expensive equipment and, therefore, is applicable for the manufacture of articles of large diameter as well as those of small diameter.

I have chosen to illustrate the invention herein as applied to the manufacture of tubes, but it will be understood, of course, that it is not thus limited, and is applicable to the manufacture of cylindrical articles generally, such, for example, as rods with or without a central core.

The method of the invention may be more clearly understood from the following detailed description when read in connection with the accompanying drawing illustrating one method by which the desired uniform high pressure is obtained. In the drawing:

Figure 1 is a sectional view of the cylindrical sheet or shell which is used to obtain the desired pressure upon the tube illustrating the tube and its mandrel in place, such view being taken along line 1—1 of Figure 2; and Figure 2 is a partial plan view of the same device.

In accordance with the present invention, after the cylindrical article has been wound to obtain the desired thickness of laminations, it is entirely enshrouded in a constrictable shell having a cylindrical internal wall. The shell is uniformly constricted about the article to obtain the desired uniform pressure over the entire outer surface of the article, and the shell and article are heated at a temperature sufficient to fuse the binder while pressure is uniformly and continuously applied to constrict the shell.

The fibrous sheet material may be wood pulp, cotton rag, asbestos or other paper, or it may be cloth. Fibrous sheet material is preferably coated or impregnated throughout its entire surface with an adhesive or binder prior to the winding of the sheets, although in some instances it will be sufficient to apply the adhesive or binder to portions of the fibrous sheet material. Any suitable heat-fusible adhesive may be employed, for example, glue, shellac or other natural resins, or any one of the so-called heat-curable synthetic resins. In the preferred form, a synthetic resin of phenolic type such as a phenol-formaldehyde resin is employed, which, as is well known, exists in two stages, to wit, the initial or soluble and fusible stage, and the final or insoluble and infusible stage, the latter resulting from heating the initial resin with or without pressure. In the method of the present invention, the phenolic resin is converted to its final stage during the heating of the preformed cylindrical article in the constrictable shell.

In practicing the contemplated method, sheets of fibrous material, which may be paper or other like material, are first treated with the binder which it is desired to use, for the purpose of the present illustration, such binder being assumed to be a synthetic resin of the phenolic type in its initial stage. These impregnated sheets are wound about a mandrel of the desired size to preform the tube of the desired diameter in the usual manner. The mandrel and impregnated sheets wound thereabout are then placed within a shell-like structure, such as is illustrated in the drawing. This device comprises essentially a flexible metallic sheet 1, preferably of copper, which is rolled in the form of a cylinder, as illustrated, to form the desired shell. The longitudinal edges of the shell overlap and the innermost edge is tapered as at 2 (see Figure 1) for a reason which will be apparent hereinafter. The shell may be of any desired length depending upon the length of the tube which it is desired to make. Longitudinal plates 3 and 4 are rigidly fastened to the shell, as illustrated, by means of rivets or like fastening elements. It will be noted that the plates are spaced from the longitudinal edges of the shell a considerable distance. The outer longitudinal edge of the shell is curled or rolled as at 5 about the curled or rolled edge 6 of plate 4. The rolled edge of the shell thus embraces the rolled edge of plate 4 and is rigidly secured thereto by means of rivets 7 or the like.

A shaft 8 extends through the longitudinal opening formed within the rolled edge of plate 4 and is anchored therein by means of suitable cotter keys at its ends. The rolled edge 5 of the shell, as well as the rolled edge 6 of plate 4, are provided with slot openings 9 at spaced intervals. A plurality of threaded eye bolts 10 are rotatably mounted upon shaft 8 within slots so as to be adapted for movement therein. Plate 3 has formed thereon a longitudinal ridge 11 which is slotted at spaced intervals corresponding to those of the above-mentioned slots so that bolts 10 may be received thereby. Suitable coiled springs 12 and nuts 13 are provided on each of the bolts, the springs being arranged between their respective nuts and ridge 11 to enable the drawing of the edges of the shell relative to each other in an obvious manner to constrict the shell about the preformed tube.

The details of construction of one embodiment of the device which I use for obtaining the desired pressure having been described, it will now be apparent that when the preformed tube 14 and its mandrel 15 are placed within the shell, the desired uniform high pressure may be readily obtained by drawing up the nuts on the various bolts along the shell to compress the springs. Any desired number of bolts may be provided so long as they are uniformly spaced and enable a uniform pressure upon the tube to be obtained. The reason for having edge 2 of the shell tapered will now be apparent since this provides a cylindrical internal wall on shell 1 and results in a seamless tube with no line of inherent weakness. After the shell has been properly constricted about the preformed tube on the mandrel so as to obtain the desired pressure over the entire surface thereof, the tube is placed in a suitable oven where it is properly heat-treated while under pressure. It is important to note that springs 12 function to maintain the shell tightly about the tube during the heating process. During this process, the resin melts and is caused to penetrate the fibres, the volume of the tube diminishing which results in a diminution of its outer diameter and circumference. The springs, being compressed, constrict the shell further to maintain the desired uniform pressure on the tube. After sufficient heat-treatment to convert the resin to its final stage, the tube is removed from the oven and the constrictable shell is taken off after which the mandrel is also removed.

The temperature and length of time of heating as well as the pressure obtained by the constrictable shell varies with the particular binder employed, and the thickness of the superposed layers of fibrous sheet material. These factors are determinable by the operator from his knowledge of the art. In a typical case, using a binder of a phenol-formaldehyde resin with a wall thickness of up to 1½ inches, a satisfactory tube is obtained by heating the preformed article in the constrictable shell at 300° F. to 350° F. for ten to twelve hours. The pressure exerted by the constrictable shell may vary from fifty pounds per square inch to one hundred pounds per square inch in this case.

Considerable modification is possible in the construction of the constrictable shell and in the fibrous sheet material and binder employed as well as in the factors involved in the heating without departing from the essential features of the method of the present invention.

I claim:

1. The method of treating a composite body of cylindrical form capable of withstanding pressure having a plurality of superposed sheets of fibrous material associated with a heat-fusible binder which comprises subjecting the entire body to a desired uniform pressure throughout by the constriction of a surrounding wall, heating the composite body to cause the binder to fuse while under said pressure, and during said heating further constricting said wall to compensate for the decrease in the diameter of the body.

2. The method of treating a composite cylindrical tube having a plurality of superposed sheets of fibrous material associated with a heat-fusible binder wound upon a mandrel which comprises subjecting the entire tube to a desired uniform pressure throughout by a constriction of a surrounding wall, heating the tube to cause the binder to fuse while under said pressure, and during said heating further constricting said wall to compensate for the decrease in the diameter of the tube.

3. The method of treating a composite body of cylindrical form capable of withstanding pressure having a plurality of superposed sheets of fibrous material associated with a heat-convertible synthetic resin in its fusible stage which comprises subjecting the entire body to a desired uniform pressure throughout by the constriction of a surrounding wall, heating the composite body to convert the synthetic resin to its infusible stage while under said pressure, and during said heating further constricting said wall to compensate for the decrease in the diameter of the body.

4. The method of treating a composite cylindrical tube having a plurality of superposed sheets of fibrous material associated with a heat-convertible synthetic resin in its fusible stage wound upon a mandrel which comprises subjecting the entire tube to a desired uniform pressure throughout by the constriction of a surrounding wall, heating the tube to convert the synthetic resin to its infusible stage while under said pressure, and during said heating further constricting said wall to compensate for the decrease in the diameter of the tube.

5. The method of treating a composite body of cylindrical form capable of withstanding pressure having a plurality of superposed sheets of fibrous material associated with a heat-fusible binder which comprises subjecting the entire body to a desired uniform pressure throughout by the constriction of a cylindrical surrounding flexible metallic wall, heating the composite body to cause the binder to fuse while under said pressure, and during said heating further constricting said wall to compensate for the decrease in the diameter of the body.

6. The method of treating a composite body of cylindrical form capable of withstanding pressure having a plurality of superposed sheets of fibrous material associated with a heat-convertible synthetic resin in its fusible stage which comprises subjecting the entire body to a desired uniform pressure throughout by the constriction of a cylindrical surrounding flexible metallic wall, heating the composite body to convert the synthetic resin to its infusible stage while under said pressure, and during said heating further constricting said wall to compensate for the decrease in the diameter of the body.

7. The method of treating a composite body of cylindrical form capable of withstanding pressure having a plurality of superposed sheets of fibrous material associated with a heat-fusible binder which comprises subjecting the entire body to predetermined uniform pressure of a constrictable surrounding flexible metallic wall by the exertion of a continuing constricting tension on said wall, heating the composite body to cause the binder to fuse while under said pressure, and during said heating compensating for the decrease in the diameter of the body to maintain thereon said predetermined pressure by the further constriction of said wall caused by the constricting tension exerted thereon.

8. The method of treating a composite body of cylindrical form capable of withstanding pressure having a plurality of superposed sheets of fibrous material associated with a heat convertible synthetic resin in its fusible stage which comprises subjecting the entire body to predetermined uniform pressure of a constrictable surrounding flexible metallic wall by the exertion of a continuing constricting tension on said wall, heating the composite body to convert the synthetic resin to its infusible stage while under said pressure, and during said heating compensating for the decrease in the diameter of the body to maintain thereon said predetermined pressure by the further constriction of said wall caused by the constricting tension exerted thereon.

FRANK H. BENGE.